(12) United States Patent
Pott et al.

(10) Patent No.: US 7,665,772 B2
(45) Date of Patent: Feb. 23, 2010

(54) METALLIC CUTTING RING

(75) Inventors: Harald Pott, Hückeswagen (DE);
Harald Schmidt, Wipperfürth (DE)

(73) Assignee: Voss Fluid GmbH & Co. KG, Wipperfurth (DE)

( * ) Notice: Subject to any disclaimer, the term of this patent is extended or adjusted under 35 U.S.C. 154(b) by 4 days.

(21) Appl. No.: 11/659,922

(22) PCT Filed: Aug. 8, 2005

(86) PCT No.: PCT/EP2005/053899

§ 371 (c)(1),
(2), (4) Date: Feb. 19, 2008

(87) PCT Pub. No.: WO2006/018407

PCT Pub. Date: Feb. 23, 2006

(65) Prior Publication Data

US 2009/0033094 A1     Feb. 5, 2009

(30) Foreign Application Priority Data

Aug. 10, 2004   (DE) .................. 20 2004 012 473 U

(51) Int. Cl.
*F16L 33/00*        (2006.01)
(52) U.S. Cl. ..................................... 285/249; 285/341

(58) Field of Classification Search ............... 285/323, 285/249, 255, 332.1, 334.2, 342, 343, 341
See application file for complete search history.

(56) References Cited

U.S. PATENT DOCUMENTS

| 2,406,488 A | | 8/1946 | Brock | |
|---|---|---|---|---|
| 3,325,192 A | * | 6/1967 | Sullivan | 285/341 |
| 3,512,812 A | * | 5/1970 | Kreidel et al. | 285/341 |
| 3,695,647 A | * | 10/1972 | Pugliese | 285/341 |
| 3,889,989 A | | 6/1975 | Legris | |
| 6,073,976 A | * | 6/2000 | Schmidt et al. | 285/341 |
| 6,641,180 B2 | * | 11/2003 | Udhoefer | 285/342 |

FOREIGN PATENT DOCUMENTS

| DE | 4304534 A1 | 8/1994 |
|---|---|---|
| GB | 1117987 A | 6/1968 |

\* cited by examiner

*Primary Examiner*—David E. Bochna
(74) *Attorney, Agent, or Firm*—Brinks Hofer Gilson & Lione

(57) ABSTRACT

The invention provides for a metallic cutting ring for a screw connection for sealingly connecting a tube to an attachment part, which metallic cutting ring has a tube abutment section and a cutting section which adjoins the tube abutment section in the axial direction. The cutting section having a stop which points radially outward from the outer periphery of the cutting ring and has a stop face, which runs transversely with respect to the cutting ring longitudinal axil, for the attachment part. The stop for the attachment part has an annular peripheral stop edge which projects beyond the stop face.

4 Claims, 2 Drawing Sheets

METALLIC CUTTING RING

CROSS REFERENCE TO RELATED APPLICATIONS

This application claims priority to PCT/EP2005/053899 filed Aug. 8, 2005, which claims priority from DE 20 2004012473.4 filed Aug. 10, 2004.

FIELD OF THE INVENTION

The present invention relates to a metallic cutting ring for a screw connection for sealingly connecting a tube to an attachment part.

BACKGROUND OF THE INVENTION

Screw connections having similar rings are known from DE-B 1 167 608, DE-B 1 175 639, GB 1 117 987 A and U.S. Pat. No. 2,406,488, in all of which screw connections, however, the stop for the stop part is situated on the end side of the cutting ring.

For example, DE-B 1 167 608 describes a threaded attachment joint for tubes comprising an attachment piece which has an end face which runs perpendicular to the tube axis and a similarly-running annular face for supporting the tube end. In addition, the threaded joint comprises a sleeve nut which encloses the tube end and can be screwed onto the attachment piece, and a hardened sealing ring, which is arranged on the tube end. As the sleeve nut is tightened, the hardened sealing ring bites with a radially inward aligned cutting edge, which is arranged in the region of its rear end, into the tube outer face. The hardened sealing ring also bites with an end-side annular cutting edge, which can also be regarded as a stop, into the end face of the attachment piece, with that part of the sealing ring being guided, with little play, at the outside by the wall of the cylindrical bore adjoining the end face, and at the inside by the outer face of the tube end.

DE-B 1 175 639 describes a method for producing a sealing ring for tube connections. The sealing ring is between the receiving cone of an attachment piece and a press-in piece, which interacts with said attachment piece, and bites with a hard cutting edge into the outer casing of the tube. This outer casing is to be attached as said press-in piece is axially displaced, with the front part of the sealing ring being altered from a cylindrical shape into a conical shape by means of rotating rollers until a lug is formed, which projects beyond the outer edge of the front part.

GB 1 117 987 A describes a tube coupling with which, as a tube is attached, the tube end can be expanded. Serving this purpose is a ring, referred to as a "tube-flaring sleeve", which fixedly holds the tube which is to be expanded by means of a radially inwardly aligned cutting edge when, during attachment, the end of said tube is pressed against a conical, centrally arranged expanding body, referred to as a "flaring member". At the end side, the expanded tube portion comes into contact with a radially outer conical face of a mating bore. The ring, at the end side which faces towards the expanding body and the mating bore, has a radial cutting edge and axially outwardly and inwardly aligned inclined faces which have different bevel angles and are matched to the conical faces of the expanding body and the mating bore.

A tube connection having a cutting ring is also recited in U.S. Pat. No. 2,406,488. The cutting ring has a flange which points obliquely radially inward and, during attachment, is bent back, by an attachment piece which bears against it, from an original inclined position into a position aligned approximately perpendicular to the longitudinal axis of the connection, and thereby cuts into the casing of the tube which is to be connected. The cutting ring also has on an end face, an axially aligned annular rib which, during attachment, comes into contact as a stop against the attachment piece and thereby stops the bending movement of the flange.

A metallic cutting ring which corresponds to the type specified in the Background Section is known from DE 33 41 726 A1. Said document describes a screw connection for sealingly connecting a tube to a tube connecting part or screw-in part, composed of a body. The body has a bore which narrows conically in a continuous fashion from an end face to the interior of the body. A nut, which can be screwed onto the body, has a bore, which narrows conically away from the body. A intermediate ring is provided with its end facing the body with a plurality of radially inwardly aligned cutting edges and is held in a clamped fashion between the conical bore in the body and the conical bore in the nut. This is intended to achieve the object of providing, with the intermediate ring, a cutting ring which, while having a high degree of axial strength, has a low degree of deformation work in the radial direction. This is achieved in that axially aligned ribs are arranged so as to be uniformly distributed on the periphery of a solid region of the cutting ring. It is possible by means of a targeted formation of the ribs to provide the cutting ring with an elastic behavior, which is matched to the respective requirements. In order to additionally provide that assembly process is complete, the nut-side conical stop faces of the solid region and the rib region are offset against one another in a defined way. In the known cutting ring, an annular bead is provided on the nut-side end with the ribs being situated on the outside of said annular bead. Also, a tube abutment section is formed in the region of said annular bead. Where an inner lateral surface of said region encloses, in a positively engaging manner, the outer lateral surface of the tube, which is to be connected.

The tube abutment section is adjoined in the axial direction towards the body by a cutting section, which has a stop that points radially outward from the periphery of the cutting ring and runs transversely with respect to the cutting ring longitudinal axis for the attachment part. In one embodiment, a stop face of the stop runs perpendicularly to the longitudinal axis of the ring, and in a further embodiment, obliquely with respect to the longitudinal axis of the ring, and in each case merges into said ribs, which are situated further radially outward. The stop face acts as a tightening limiter as the nut is tightened. That is to say, when the stop face comes into firm contact with the attachment part, the tightening torque increases abruptly, thereby signaling the end of the assembly process.

In contrast to DE-B 1 167 608, the cutting ring of DE 33 41 726 A1, permits a limitation of tightening during assembly, and the arrangement of an additional sealing edge in the front ring region.

SUMMARY OF THE INVENTION

The present invention is based on the object of providing a metallic cutting ring with improved ease of assembly, and therefore a more cost-effective method for producing the threaded joint, while providing a high degree of sealing action.

In at least one embodiment, a cutting ring with a stop for an attachment, part, wherein the stop has an annular peripheral stop edge which projects beyond the stop face is provided.

The embodiment first makes it possible to provide a screw connection for sealingly connecting a tube to an attachment part, wherein the screw connection has an increased level of functionality, since the annular peripheral stop edge, which projects beyond the stop face, forms an additional sealing edge. In addition, it is possible to reduce the assembly expenditure in producing the screw connection in that the stop edge, which is more easily deformable than the stop face, provides tolerance compensation with regard to the axial length dimension of the ring or of the attachment part.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION

Figure 1:
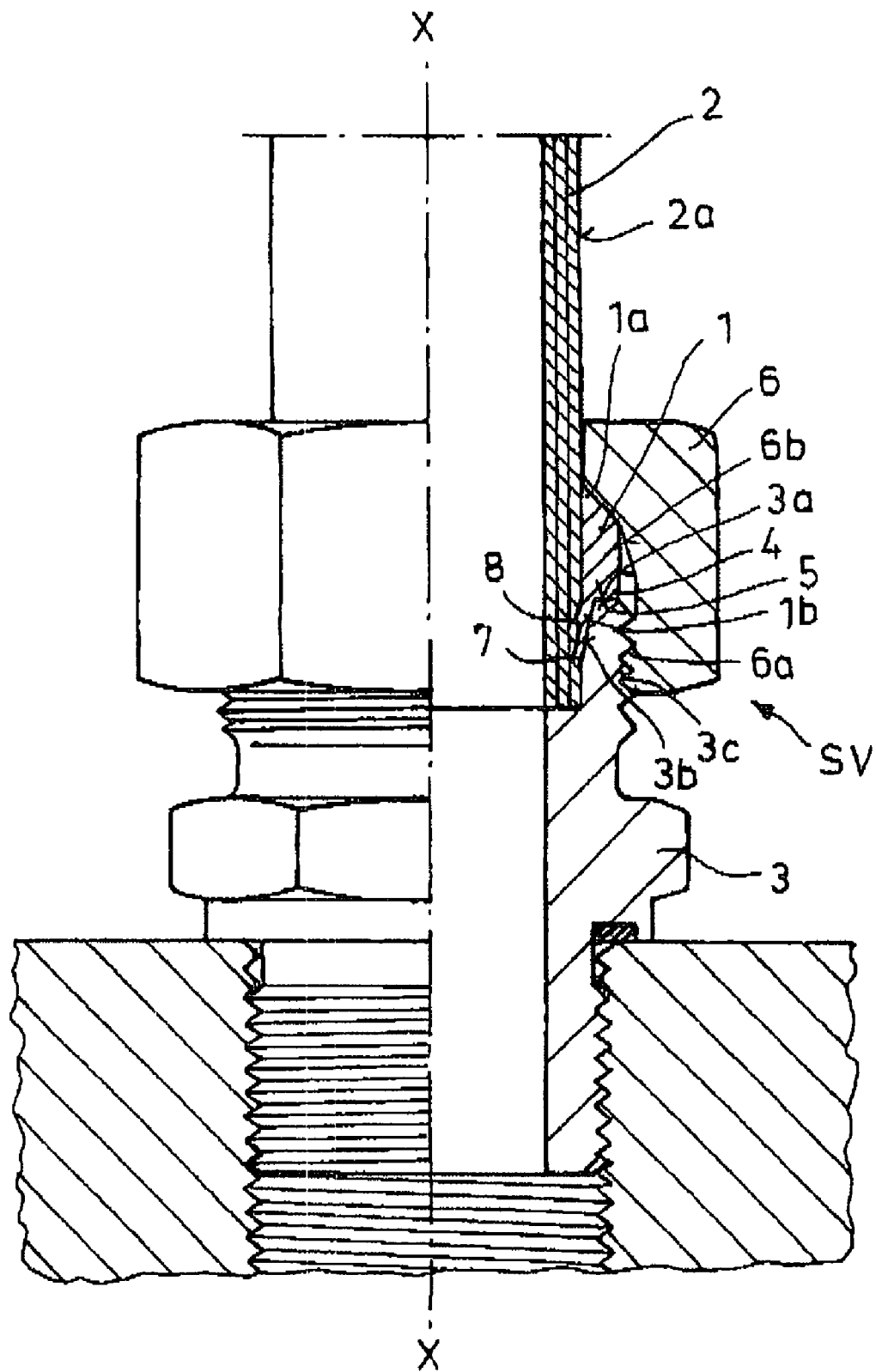
FIG. 1 is an axial half-section through a screw connection having a metallic cutting ring according to the invention.

In the different Figures of the drawing, identical and mutually corresponding parts are always provided with the same reference symbols and are therefore also generally described only once in each case.

Referring to FIG. 1, a metallic cutting ring 1 according to the invention is designed for use with a screw connection SV for sealingly connecting a tube 2 to an attachment part 3, such as for example, a tube piece or a screw-in part.

The cutting ring 1 has a tube abutment section 1a and a cutting section 1b which adjoins the tube abutment section 1a in the axial direction. The cutting section 1b has a stop 4 which points radially outward from the outer periphery of the cutting ring 1. The cutting section has a stop face 5, which runs transversely with respect to the cutting ring longitudinal axis X-X. The stop face 5 is for interfacing with the attachment part 3, more specifically an end face 3a of the attachment part 3.

The attachment part 3 is provided with an axially running conical bore 3b, into which the cutting ring 1 engages with its cutting section 1b. A nut 6 which can be screwed onto an attachment part 3, is provided with an outer thread 3c, and is likewise provided, adjacent to its threaded bore 6a, with a conical bore 6b. Here, the cutting ring 1 is clamped between, in the region of its cutting section 1b, the conical bore 3b of the attachment part 3 and, in the region it its tube abutment section 1a, the conical bore 6b of the nut 6.

At its side facing towards the attachment part 3, specifically cutting section 1b, the cutting ring 1 is provided with cutting edges 7, 8. The two cutting edges 7, 8 slide axially on the attachment part 3 as the nut 6 is tightened, and cut radially into the wall 2a of the tube 2 which is to be connected, under the action of the conical bore 3b until the stop 4 is reached.

The stop 4 with its radially extending stop face 5, which runs transversely with respect to the cutting ring longitudinal axis on the side facing towards the attachment part 3, acts as the nut 6 is tightened as a tightening limiter, such that when the stop face 5 is in firm contact, an applied torque for tightening increases abruptly. In at least one embodiment, the stop 4 for the attachment part 3 has an annular peripheral stop edge 9 which projects beyond the stop face 5 (see FIGS. 2 and 3) The stop edge 9 forms an additional sealing edge, and promotes tolerance compensation, particularly in the direction of the longitudinal axis X-X, during assembly.

At the side of the nut 6, the cutting ring 1 is supported with its annular-bead-like tube abutment section 1a, which is preferably conical at the outside, on the nut 6 at the outside and on the tube 2 at the inside. As a result of the positively locking contact against the wall 2a of the tube 2, it is ensured here that no notching effects occur on the tube 2 which could reduce the strength of the tube 2.

Figure 2:
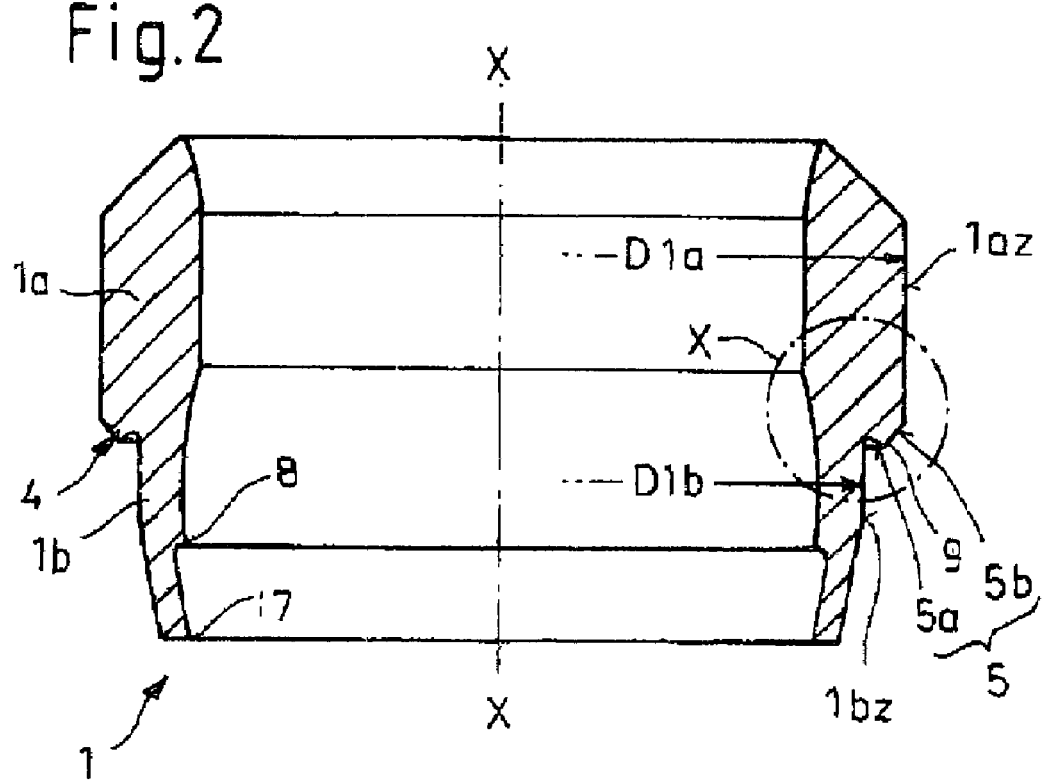
FIG. 2 is an axial longitudinal section through the metallic cutting ring of FIG. 1 according to the invention.
Figure 3:
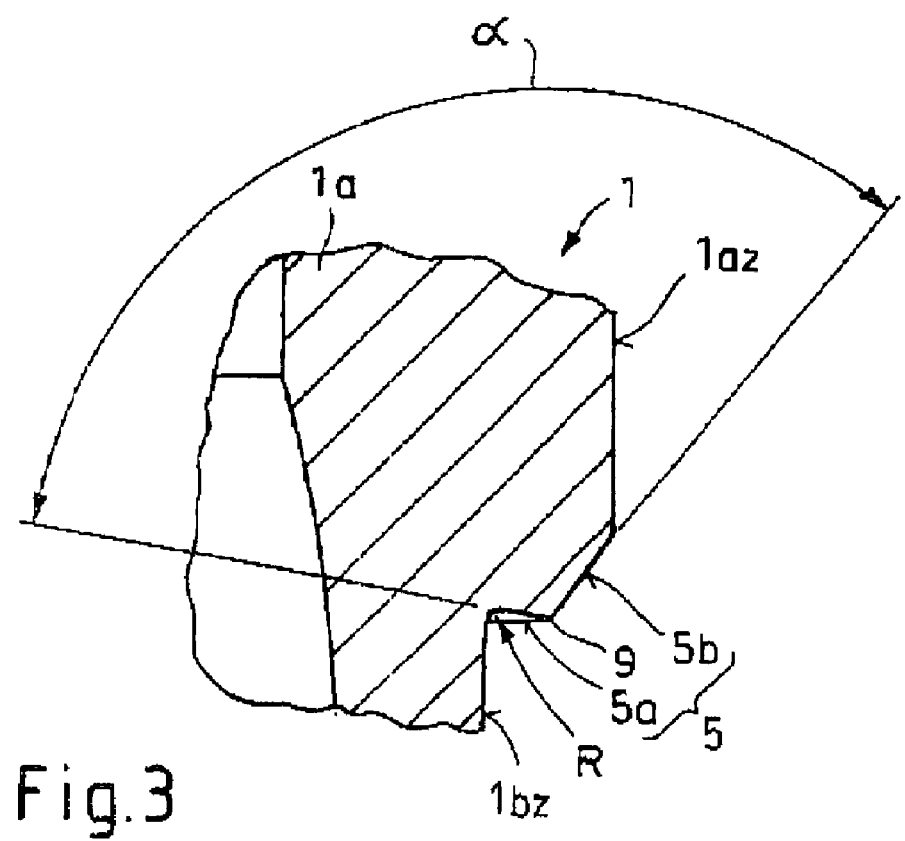
FIG. 3 is a detail denoted in FIG. 2 by X.

As shown in FIG. 2 and more clearly in FIG. 3, in a preferred embodiment the stop edge 9 divides the stop face 5 into two, one inner and one outer, annular partial faces 5a, 5b which are arranged concentrically with respect to one another, with the partial faces 5a, 5b in particular having a different angle of inclination relative to the cutting ring longitudinal axis X-X. In this way, the stop edge 9 can, while having a high degree of stability and strength, be provided with a contour design which is optimized with regard to the abutment and the sealing action thereby produced.

FIG. 3 shows in particular that the inner partial face 5a widens conically in the direction of the attachment part 3, while the outer partial face 5b narrows conically in the direction of the attachment part 3, so that an obtuse angle $\alpha$ is enclosed between the partial faces 5a, 5b. It is possible by means of the selection of said angle $\alpha$ to define, in a predetermined way, the pressing behavior of the stop edge 9 against the end face 3a of the attachment part 3. For example, the tightening torque may be increased once the stop 4 has been reached.

Particularly possible are other embodiments of the stop face 5 and the stop edge 9. For example, the stop edge can be designed to be more or less obtuse by varying the angle $\alpha$ or by means of a possible slight rounding of the tip of the edge.

The angle of inclination of the inner partial face 5a relative to the cutting ring longitudinal axis X-X can, for example, deviate from a perpendicular profile to only a small degree, in particular, by less than the angle of inclination of the outer partial face 5b, for example, by up to a maximum of 25° but preferably by less than 15°. Here, it is possible to provide a rounding R at a fillet generated by a recess of the outer diameter D1a of a preferably cylindrical region 1az of the outer contour of the tube abutment section 1a to the outer diameter D1b of a preferably likewise cylindrical region 1bz of the outer contour of the cutting edge 1b. Rounding R leads to an optimization of the profile of the mechanical stresses in the assembled cutting ring 1.

As a person skilled in the art readily appreciates, the above description is meant as an illustration of implementation of the principles of this invention. This description is not intended to limit the scope or application of this invention in that the invention is susceptible to modification, variation and change, without departing from the spirit of this invention, as defined in the following claims.

What is claimed is:

1. A metallic cutting ring for a screw connection for sealingly connecting a tube to an attachment part, the cutting ring having an outer periphery and comprising:

a tube abutment section, and a cutting section adjoining the tube abutment section in an axial direction;

with the cutting section including cutting edges and a stop;

said edges being disposed in said cutting section opposed to said attachment part;

wherein said stop:

is disposed closer to said tube abutment section than said edges, is directed radially outward from the outer periphery of the cutting ring, said outer periphery having an outer diameter, and includes a stop face for the attachment part which is disposed transversely to a cutting ring longitudinal axis, wherein the stop has an annular peripheral stop edge which extends beyond the stop face;

wherein the stop edge divides the stop face into an inner and an outer annular partial face which are concentrically disposed to each other;

wherein the partial faces have respectively different angles of inclination relative to the cutting ring longitudinal axis;

wherein the inner partial face widens conically in the direction of the attachment part;

wherein the outer partial face narrows conically in the direction of the attachment part; and wherein an obtuse angle is enclosed between the partial faces.

2. The cutting ring as claimed in claim 1 wherein the angle of inclination of the inner partial face relative to the cutting ring longitudinal axis deviates from a perpendicular profile relative to the cutting ring longitudinal axis by up to 25°.

3. The cutting ring as claimed in claim 1 wherein the angle of inclination of the inner partial face relative to the cutting ring longitudinal axis deviates from a perpendicular profile relative to the cutting ring longitudinal axis by less than 15°.

4. The cutting ring as claimed in claim 1, the outer periphery of the tube abutment section having an outer diameter wherein a rounding is provided at a fillet which is generated by a recess of the outer diameter of the tube abutment section to the outer diameter of the cutting ring.

* * * * *